A. R. MILLER & H. E. BALL.
BAIT.
APPLICATION FILED MAY 28, 1910.
981,454. Patented Jan. 10, 1911.
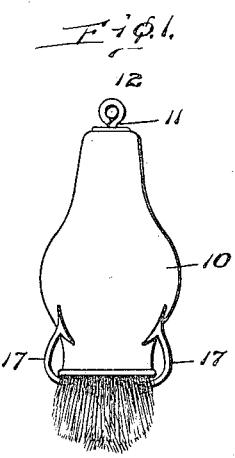
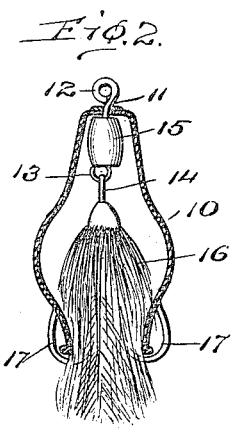
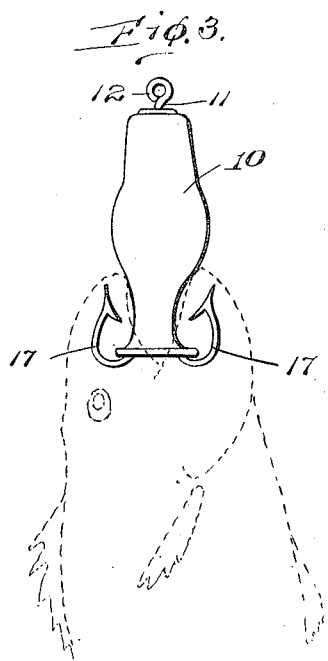
Inventors
Arthur R. Miller
and Horace E. Ball,
Witnesses

UNITED STATES PATENT OFFICE.

ARTHUR R. MILLER AND HORACE E. BALL, OF PAW PAW, MICHIGAN.

BAIT.

981,454.

Specification of Letters Patent. Patented Jan. 10, 1911.

Application filed May 28, 1910. Serial No. 563,950.

*To all whom it may concern:*

Be it known that we, ARTHUR R. MILLER and HORACE E. BALL, citizens of the United States, residing at Paw Paw, in the county of Van Buren and State of Michigan, have invented certain new and useful Improvements in Bait; and we do hereby declare the following to be a full, clear, and exact description of the invention, such as will enable others skilled in the art to which it appertains to make and use the same.

This invention relates to fishing bait and has for an object to provide an artificial bait having a flexible elastic casing substantially pear-shape to which hooks are secured.

A further object of the invention is to provide such flexible elastic casing with a shank extending through one end of the casing and with a movable hook having a shank inserted in the open end of the casing and connected with the shank inserted through the wall of the casing.

A further object of the invention is to provide a flexible elastic casing open at one end with a hook inserted into the open end and a shank inserted through the wall of the casing and engaging the hook with a weight or sinker connected with the shank within the casing.

A further object of the invention is to provide a flexible elastic casing substantially pear-shape through the closed end of which is extended a shank and through the open end of which is extended a hook, such hook and shank being detachably connected within the casing.

With these and other objects in view, the invention comprises certain novel constructions, combinations and arrangements of parts, as will be hereinafter fully described and claimed.

In the drawings:—Figure 1 is a view of the improved bait in side elevation. Fig. 2 is a longitudinal diametrical sectional view of the bait. Fig. 3 is a view of the bait in side elevation illustrating the resiliency or flexibility of the casing when the bait is taken by a fish.

Like characters of reference designate corresponding parts throughout the several views.

A flexible casing or envelop 10 is provided which is constructed of any approved material such as rubber, celluloid or other compound, being substantially pear-shape closed at one end and open at the other, the opening being at the larger end as indicated. Through the smaller end is inserted a shank 11 provided upon the outside with an eye 12 for attaching a line and upon the inside with a hook 13 for attaching the shank 14 of a hook preferably a multiple hook as indicated. Upon the shank is also secured a weight or sinker 15 and preferably upon the hook shank is secured any of the ordinary decorations as bucktail, feathers, yarn, silk or other ornaments, indicated at 16. The hooks extend through the open end of the envelop and curve upwardly along the side as indicated at 17 in position to be engaged by a fish indicated in dotted lines at Fig. 3.

Some of the advantages and operative features of the bait are that in case of breakage of the hooks the rubber envelop 10 may be rolled backwardly and the hook detached from the eye 13 and replaced by a similar or any other hook convenient. The weight or sinker 15 positioned as it is produces a successful deep water bait but one which can nevertheless be successfully used in shallow water and by reason of the position of the hooks relative to the envelop can work over and under obstructions in the water more easily and safely than unprotected hooks as the rubber envelop prevents the hook from catching under ordinary strains upon any obstruction while being collapsible to permit the fish to become properly impaled upon the hooks when biting.

What we claim is:—

1. The combination with a collapsible elongated envelop open at one end, of a shank extending through the closed end, a sinker secured upon the shank adjacent the closed end, and a hook having a stem extending into the open end of the envelop and attached to the shank adjacent the sinker.

2. The combination with a collapsible envelop open at one end and having a central bulge, of a shank extending through the closed end of the envelop, a sinker carried upon the shank at the closed end, and a hook having a stem extending through the open end of the envelop and removably engaged upon the shank and with the impaling point of the hook substantially bearing against the bulge of the envelop.

3. The combination with a collapsible envelop open at one end, of a shank extended through the closed end and provided with a ring within and without the envelop, a sinker carried upon the shank within and adjacent to the closed end of the envelop, and a hook having a stem extending into the open end of the envelop and engaged upon the inner ring of the shank and with the barbed end of the hook substantially bearing against the exterior of the envelop.

In testimony whereof we affix our signatures in presence of two witnesses.

ARTHUR R. MILLER.
HORACE E. BALL.

Witnesses:
MARTHA E. MASON,
LENA E. HARRISON.